No. 895,493. PATENTED AUG. 11, 1908.
J. H. O'BRIEN.
FISHING TACKLE.
APPLICATION FILED MAR. 2, 1908.
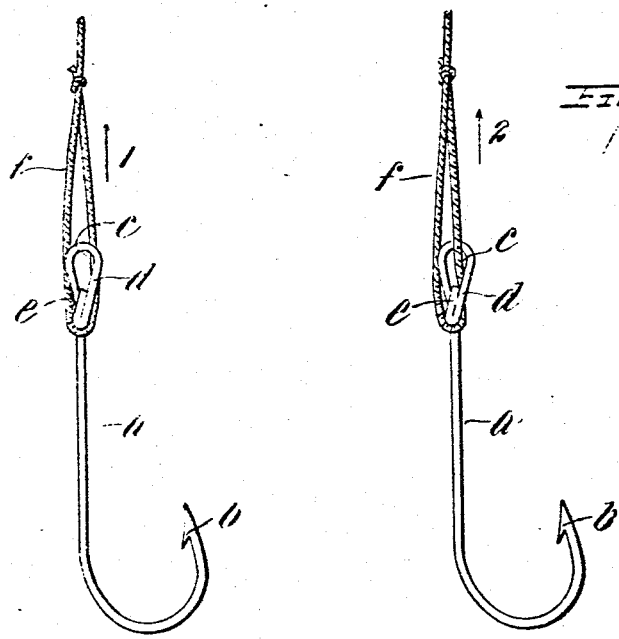
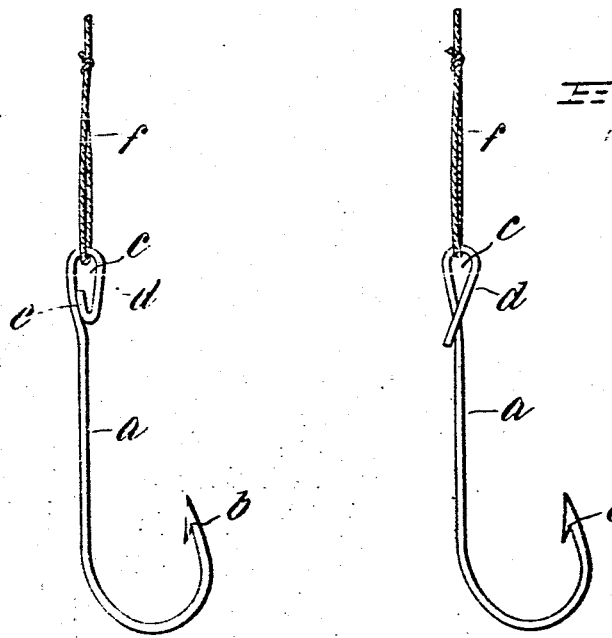

UNITED STATES PATENT OFFICE.

JOHN H. O'BRIEN, OF GARDNER, MASSACHUSETTS.

FISHING-TACKLE.

No. 895,493.  Specification of Letters Patent.  Patented Aug. 11, 1908.

Application filed March 2, 1908. Serial No. 418,710.

*To all whom it may concern:*

Be it known that I, JOHN H. O'BRIEN, a citizen of the United States, residing at Gardner, in the county of Worcester and State of Massachusetts, have invented or discovered certain new and useful Improvements in Fishing-Tackle, of which the following is a specification, reference being had therein to the accompanying drawings.

This invention has for its object to provide fish hooks or similar devices with closed or guarded eyes of such construction as will permit of their ready connection with or detachment from other parts, such as snoods or leaders, sinkers, swivels, guides, or other portions of fishing tackle. By providing a fish hook with a guarded eye of such construction that the loop of a snood or leader may be readily drawn into or out of such eye, and after having been drawn into the eye will be guarded from accidental detachment therefrom, it will be understood that hooks provided with different baits, either natural or artificial, may be readily attached to the loop of a snood or leader or readily detached therefrom when it is desired to substitute a baited hook for a non-baited hook, or when it is desired to change a hook provided with a certain kind of bait for a hook having a different kind of bait.

In carrying the invention into effect a shank of a fish hook formed from steel wire, is bent around toward the barbed portion of the hook to form an eye the inner part of which tightly bears against the shank of the hook in such a manner as to form a tightly closed eye, which is, however, of such construction as to permit the loop of a snood or leader, when held closely in contact with the shank of the hook, to be drawn into the said eye, an arm or portion of which will spring sufficiently to permit this to be done. The closed eye preferably has a reversely or inwardly turned portion which crosses the shank of the hook and the extreme end of which, within the eye, serves as a guard to prevent the accidental displacement of the loop of the snood or leader from the hook; the construction, however, being such that by throwing one limb of the loop of the snood or leader which is within the eye of the hook against the shank of the hook a draft on the said snood or leader, in the same direction which was originally required to draw the loop of the snood or leader into the eye of the hook, will draw it out of the same, as will hereinafter appear.

Referring to the drawings, Figures 1 and 2 show a fish hook constructed in accordance with the preferred form of the invention, together with a portion of a snood or leader, the latter being differently disposed in the two views. Figs. 3 and 4 show two other forms or modifications of the invention.

Referring to the drawings, *a* denotes the shank of a fish hook and *b* the barb or point thereof. The shank *a* is provided at its end farthest from the barb of the hook with a tightly closed eye *c* which preferably comprises a backwardly turned portion *d* and an inwardly turned portion *e*, having a blunt end bearing against an inner portion of one limb of the eye *c* within the opening of said eye, and being thus adapted to serve as a guard to prevent the loop of the snood or leader *f*, when once drawn into the eye of the hook, as shown for example in Fig. 3, from being accidentally withdrawn or displaced from said eye.

In the preferred form of the invention shown in Figs. 1 and 2 the portion *d* is crossed over and bears yieldingly against the shank *a* of the hook, and the inturned portion *e* projects across the shank of the hook into the eye *c*.

In the form of the invention shown in Fig. 3 the inturned guard portion *e* is merely abutted closely against the shank of the hook tightly enough to prevent the accidental displacement of the loop of the snood or leader.

In the form of the invention shown in Fig. 4 the limb *d* of the eye *c* is simply crossed upon the shank of the hook and presses tightly but yieldingly against the latter, so as to prevent the accidental displacement of the loop of the snood or leader *f*, while permitting said loop to be drawn into or withdrawn from said eye.

As the wire from which the hooks are formed is of steel or other spring metal it will be understood that the element *d*, forming the outer portion of the eye *c*, will yield or spring slightly, when sufficient force is applied to the snood or leader, to permit the loop of the latter to be drawn into the eye of the hook; and will also yield to permit the withdrawal of the snood or leader from the eye of the hook, while the natural resilience of the metal will close the eyes of the hooks, in any of the different forms of the invention shown, with sufficient tightness to prevent the accidental displacement or withdrawal of the loops of snoods or leaders from the eyes of the hook.

The loop of a snood or leader f, forming part of a fishing line, may be drawn into an eye c, when the parts are disposed as in Fig. 1, by drawing on the snood or leader in the direction denoted by arrow 1, and by disposing the loops of the snood or leader as shown in Fig. 2 a draft in the direction denoted by arrow 2 will draw the loop of the snood or leader out of the eye c of the hook. Thus the parts may be quickly attached and detached, when desired, as will be readily understood.

While the invention is primarily intended to permit of detachable connections between fish hooks and leaders it will be understood that it will be applicable to detachable connections of other portions of fishing tackle, as it is obvious that a hook provided with the improved guarded eye can be connected with a sinker having a suitable loop or eye to afford attachment therewith; and that other portions of fishing tackle provided with guarded loops may be readily attached to or detached from each other simply by drawing a loop of any suitable material, which may be either fibrous or a wire loop, into or out of a guarded eye of an element of a fishing tackle provided with such eye.

Having thus described my invention I claim and desire to secure by Letters Patent:—

1. An element of fishing tackle formed of spring wire and provided with a tightly closed eye into or out of which a loop or eye of another element of the fishing tackle may be readily drawn, said eye comprising an outer limb d which crosses and bears tightly against the shank with which said eye is integral, and which limb terminates in the inturned guard portion e within the said eye.

2. A fishing hook formed from spring wire and provided with a tightly closed eye consisting of a plain or single loop of wire comprising an inturned portion e having a blunt end which bears tightly against an inner portion of one limb of said eye, so as to be adapted to serve as a guard to prevent the accidental displacement of the loop of a snood or leader which may be readily drawn into or withdrawn from the said eye.

In testimony whereof I affix my signature, in presence of two witnesses.

JOHN H. O'BRIEN.

Witnesses:
THOMAS M. CONNERS,
DAVID C. O'BRIEN.